Feb. 2, 1932.  I. M. SCHWAB  1,843,496
TEMPLE CONNECTION
Filed May 2, 1931

Inventor
ISAAC M. SCHWAB,
By L. D. Underwood
Attorney

Patented Feb. 2, 1932

1,843,496

UNITED STATES PATENT OFFICE

ISAAC M. SCHWAB, OF SAVANNAH, GEORGIA

TEMPLE CONNECTION

Application filed May 2, 1931. Serial No. 534,630.

The invention relates to eyeglasses or spectacles, and more particularly to temple connections therefor.

The facial and cranial characteristics of persons who require glasses differ very considerably in respect to pupillary distance, that is, the distance between the pupils of the eyes, the distance from the pupil to the side of the face, the height of the ear relative to a horizontal plane passing through the pupil, etc., and the opposite sides of the face or head may differ in some respects in the same individual. To prevent eye strain of the patient it is necessary to support the lenses in a certain position before the eyes, a certain distance therefrom, and in a certain angular relation to a vertical plane. Proper pupillary distance is obtained by the bridge member supported upon the nose. Temples are very useful to maintain the lenses at the proper distance from the eye and in the proper angular relation thereto. As the position of the outer edges of eyeglass lenses while in use are obviously determined by the size of the lens and pupillary distance of the user, it will be appreciated that where temples are used, the same relative arrangement between temples and lenses would not properly fit persons who differ in respect to the distance between the eye-pupil and the side of the face; and the same angular relation between a temple bar and the lenses could obviously not be employed to secure a perfect fit for persons differing considerably in the relative positions of eye and ear.

It is therefore the object of this invention to provide for a ready adjustment between temples and lenses to secure and maintain the lenses in the proper position before the eyes, irrespective of the position of the outer edges of the lenses in relation to the facial characteristics of the user.

The invention consists of an upstanding pliable arm having an outwardly extending upper portion provided with one member of a temple hinge-joint.

In the drawings forming a part of this description

Figure 1:
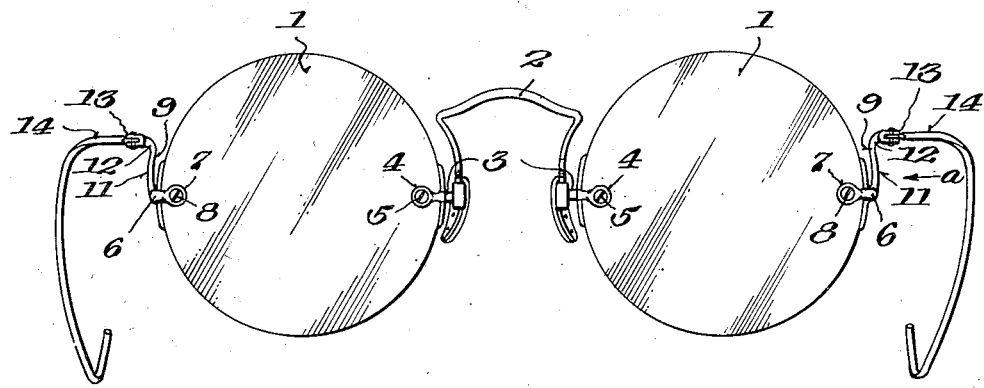
Fig. 1 is a front elevation of a spectacle or pair of eyeglasses equipped with my invention.
Figure 2:
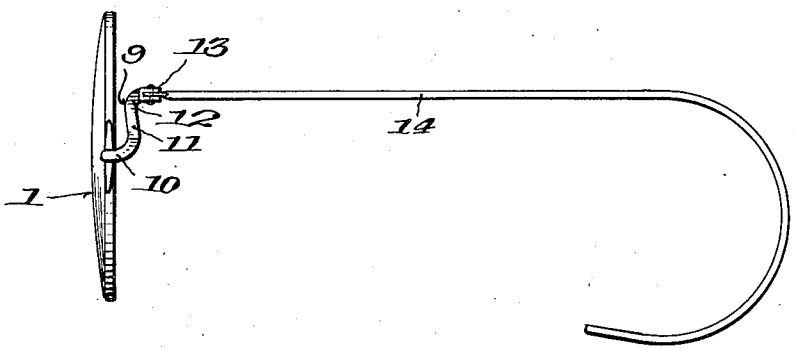
Fig. 2 is a side elevation, looking from the right in the direction of arrow $a$, Fig. 1.

Referring to the drawings in detail in which the same reference number is used to designate the same part, a pair of lenses 1 are connected by a bridge member 2 of ordinary construction. As illustrated, the lenses are supported directly by the bridge, which is provided with straps 3 and perforated ears 4, and screws 5 pass through the ears and apertures in the lenses to firmly clamp and support them. While I have shown this means of supporting the lenses, it is not material in my invention whether the lenses are supported in this way or by frames passing entirely around the lenses, or whether such frame is constructed of metal or other material. What has been described so far is well-known construction.

Temples have long been used, and they have been connected directly to the lenses and also to frames which enclose the lenses. I have illustrated my invention as applied to a direct connection. The outer edges of the lenses are perforated, and a strap 6, having perforated clamping ears 7, is secured to the lens by means of a screw 8 passing through the ears and lens. The construction last described is also well-known, and temples have been connected thereto, but heretofore, as far as I am aware, the connection has been made by extending a lug outwardly laterally from the attaching ears and providing the lug with a hinge member to which the temple has been pivoted. In such a construction, it is quite obvious that it would be impossible to make adjustments to accommodate varying facial characteristics, and the spreading of the temples puts a severe strain on the lenses, to such an extent that, in actual use, it has been found that the lenses are broken in this way. According to my invention, I provide a pliable connection between the lens and temple, and, as shown, it consists of an arm 9 of pliable metal, connected at its lower end to the strap 6. In the preferred form, as shown in Fig. 1, this arm 9 comprises a short portion 10 extending backwardly (toward the face of the user), an upstanding portion 11, and a short outwardly extending portion 12, terminating in one member of a hinge-joint, shown as consisting of two perforated ears 13, which receive the reduced perforated end of the temple bar 14. As stated, this arm 9 is "pliable," and by this term it is meant that it is composed of material which may be readily deformed, and when changed in form will retain its form against stresses to which the parts are ordinarily subjected in use. The material deemed preferable is pliable metal, which may be bent with pliers.

Figure 3:
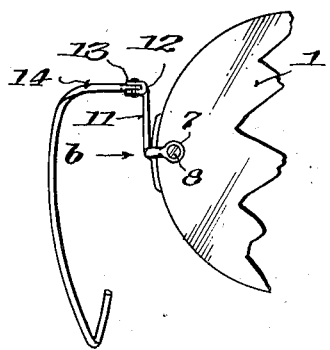
Fig. 3 is a fragmental front elevation of a modification.
Figure 4:
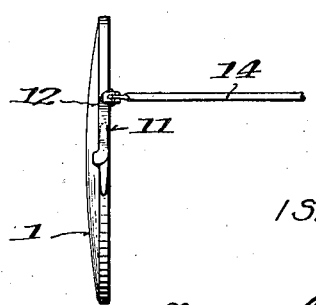
Fig. 4 is a side elevation of Fig. 3 looking in the direction of arrow $b$.

While it is deemed preferable to provide the short rearwardly extending portion 10, the same adjustment may be secured, in somewhat more limited degree, by omitting this portion, and extending the arm directly upwardly and then outwardly to be substantially in the plane of the lenses, as illustrated in Figs. 3 and 4. As above suggested the pliable arm may be secured directly to a frame enclosing the lenses whether constructed of metal or other material, and the end of the portion 10 might be soldered or otherwise secured to a frame member of ordinary construction. The point of attachment of the arm to the lens may also be varied, and instead of being secured on the edge at a point in a horizontal line passing through the center of the lens, it might be connected above or below this point.

From the above description it will be apparent that the temple joint may be moved inwardly to accommodate a narrow face, moved outwardly to accommodate a wide face, moved upwardly or downwardly to bring the temple bar to a proper height to accommodate the height of the ear and remove it from the line of lateral vision, or changed in its angular relation to the plane of the lenses, which is important particularly in regard to bifocals, all by appropriately shaping the pliable arm 9.

The dimensions of the arm 9 may readily be determined from analysis of the extreme differences in facial characteristics; the drawings forming a part of this specification illustrate a practical embodiment of the invention with the dimensions of the arm 9 substantially correctly proportioned in respect to the other parts.

While I have described in detail a preferred form of my invention and one modification thereof, it is obvious that the details of the invention may be considerably varied, and it is therefore to be understood that the invention is not confined to the details herein described but includes all changes and modifications which fall within the principles disclosed.

What I claim is:

1. A temple connection comprising a pliable arm adapted for connection to the outer edge of an eyeglass comprising a main part adapted to extend upwardly from the eyeglass and an outwardly extending shorter part terminating in one member of a temple hinge-joint.

2. A temple connection comprising a pliable arm adapted for connection to the outer edge of an eyeglass and consisting of a main upright portion, a short portion projecting forwardly from the lower end of the upright portion, and a short portion projecting outwardly from the upper end of the upright portion terminating in one member of a temple hinge-joint.

3. A temple connection comprising a supporting member connected to the outer edge of the lens, a pliable arm connected with said supporting member and extending upwardly therefrom and having an outwardly extending part terminating in one member of a temple hinge-joint.

4. A temple connection comprising a supporting member connected to the outer edge of the lens, a pliable arm connected with said supporting member and consisting of a short backwardly extending portion, an upright portion, and an outwardly extending portion terminating in one member of a temple hinge-joint.

ISAAC M. SCHWAB.